United States Patent [19]
Message et al.

[11] Patent Number: 6,043,643
[45] Date of Patent: Mar. 28, 2000

[54] SENSOR FOR A ROTATING MEMBER OF A BEARING HAVING REINFORCING ELEMENTS

[75] Inventors: Olivier Message, Tours; Franck Landrieve, Fondettes, both of France

[73] Assignee: SKF France, Clamart Cedex, France

[21] Appl. No.: 08/950,907

[22] Filed: Oct. 15, 1997

[30] Foreign Application Priority Data

Oct. 23, 1996 [FR] France .................................. 96 12895

[51] Int. Cl.[7] .............................. G01P 3/487; H01F 7/02; F16C 19/52
[52] U.S. Cl. ...................... 324/174; 324/207.22; 384/448
[58] Field of Search ..................................... 324/173, 174, 324/207.25, 207.22; 384/448; 29/593, 598; 310/153, 156; 330/284, 302, 303, 306

[56] References Cited

U.S. PATENT DOCUMENTS 4,969,753   11/1990   Kato et al. ............................... 384/448
5,325,055    6/1994   Geringer .................................. 324/174

FOREIGN PATENT DOCUMENTS 0 213 732   3/1987   European Pat. Off. .
0 726 468   2/1995   European Pat. Off. .
2 718 499   3/1995   France .
2 298 490   9/1996   United Kingdom .

OTHER PUBLICATIONS

International Preliminary Search Report dated Aug. 13, 1997.

*Primary Examiner*—Walter E. Snow
*Attorney, Agent, or Firm*—Smith, Gambrell & Rusell, LLP

[57] ABSTRACT

Encoder device for a sensor for detecting the rotational speed of a rotating member of a bearing 1 mounted on a non-rotating member of the said bearing 1, of the type comprising a sensor 7 secured to an element that is stationary with respect to the non-rotating member and past which an element forming a rotor rotates with a small air gap, which element is equipped with an encoder 8 capable of producing in the sensor 7 a periodic signal of frequency proportional to the rotational speed of the rotor element. The encoder 8 comprises an annular active part 14 made using a plasto-magnet and provided with an active region 16 arranged to travel past the sensor 7. The encoder 8 comprises a reinforcing part composed of two annular elements 15 arranged in contact with the active part 14, one on either side of the active region 16.

19 Claims, 1 Drawing Sheet

SENSOR FOR A ROTATING MEMBER OF A BEARING HAVING REINFORCING ELEMENTS

The invention relates to an encoder device for a rolling-contact bearing, in which a rotating member of the bearing carries the said encoder which consists of a multipole-magnetization ring intended to generate a variable magnetic field past a sensor secured to a stationary element. A device of this kind makes it possible to determine the rotational speed of the rotating element supporting the encoder. Such devices find applications in many fields, such as electric motors, in which they have to operate under arduous speed and temperature conditions. The multipole ring is generally made of a thermoplastic filled with magnetized particles (plasto-magnet) and constitutes the active part of the encoder.

A metal support is provided, and its function is, on the one hand, to support the encoder and, on the other hand, to secure the encoder to the rotating element whose rotational speed is to be measured. The multipole ring is often over-moulded directly onto the metal support by injection-moulding in a mould containing the metal support.

This type of encoder, the active part of which is made using a plasto-magnet, does, however, have certain drawbacks, especially at high speed and high temperature.

This is because the plasto-magnet consists of a mixture of relatively dense magnetized particles, ferrite particles for example, and a binder that consists of a synthetic material, with a particles proportion of the order of 80 to 90% with respect to the total mass of the active part in order to obtain sufficient magnetization to generate a correct signal at the sensor. A plasto-magnet of this kind has a low elastic modulus and is therefore relatively brittle.

In conventional encoders, push-fitting the encoder onto an external cylindrical bearing surface creates in the multi-pole ring, tensile stresses that the material is not very well able to withstand.

French Patent Application No. 2,718,499 discloses an encoder, the active part of which is mounted on a metal support via a layer of rubber, the metal support being push-fitted onto the rotating race of a rolling-contact bearing. The layer of rubber prevents all of the deformation of the support from being transmitted. However, it does not make it possible to avoid damaging stresses in the active part of the encoder under certain speed and temperature conditions.

In high-speed applications, for example speeds from 10,000 to 30,000 rpm, for a diameter of 50 to 120 mm, the plasto-magnet of which the ring is made experiences high internal stresses due to the centrifugal force experienced by the magnetic particles. This phenomenon may be aggravated by temperature which, if it is too high, has two damaging effects on the plasto-magnet. First of all, high temperatures cause a deterioration in the mechanical properties of the binder, and secondly, the differential expansions of the plasto-magnet of which the ring is made, and of the metal support of the ring, tend to make the ring come radially away from its support.

The object of the present invention is therefore to overcome the drawbacks of the above devices, and also to provide an encoder in which tensile stresses are not generated in the active part when the encoder is push-fitted onto the bearing surface that supports it.

The encoder device according to the invention is intended for a sensor for detecting the rotational speed of a rotating member of a bearing mounted on a non-rotating member of the said bearing, of the type comprising a sensor secured to an element that is stationary with respect to the non-rotating member and past which an element forming a rotor rotates with a small air gap, which element is equipped with a magnetic encoder capable of producing in the sensor a periodic signal of frequency proportional to the rotational speed of the rotor element, the encoder comprising an annular active part made using a plasto-magnet and provided with an active region arranged to travel past the sensor. The encoder comprises a reinforcing part composed of two annular elements arranged in contact with the active part, one on each side of the active region. The annular elements can thus take up the internal radial loadings which develop in the active part and limit the amount of tensile stress in the said active part. An encoder of this type is capable of withstanding high radial accelerations, especially at high temperature.

In one embodiment of the invention, each annular element extends between the active region and a radial face of the encoder, the active region being cylindrical. The annular elements may lie flush with the active region.

In one embodiment of the invention, the annular elements are made of non-magnetic material and have an elastic modulus which is high and a coefficient of expansion which is low compared with those of the active part of the encoder. In this way, the annular elements can greatly limit the deformation of the active part of the encoder which might result from the forces involved in push-fitting the encoder onto its bearing surface or from an expansion of the encoder under the effect of temperature.

What is more, should the active part of the encoder tend to expand, it will be held tightly within the annular elements and compressive stresses will thus be created within the plasto-magnet and these compressive stresses will prevent the material from cracking.

In one embodiment of the invention, the annular elements are in the form of a dish with a L-shaped cross section.

In another embodiment of the invention, the annular elements have a more or less rectangular cross section.

Advantageously, the encoder device comprises a support intended to be push-fitted onto a bearing surface of the element forming the rotor. The support is generally made of metal and may be designed not to deform the active part of the encoder during push-fitting or should the element forming the rotor expand. The support may be integral with one of the annular elements.

The active part of the encoder may be overmoulded onto the annular elements. In an alternative form, the annular elements may be bonded to the active part of the encoder or alternatively push-fitted onto the said active part of the encoder.

Another subject of the invention is a rolling-contact bearing equipped with an encoder for a device for detecting the rotational speed of its rotating race with respect to its non-rotating race, the encoder being as described earlier.

Thanks to the invention, an encoder is obtained that is mechanically stable even at high temperature, but at the same time remains simple and economical to manufacture.

The invention will be better understood from studying the detailed description of a number of embodiments of the invention, taken by way of non-limiting examples and illustrated by the appended drawings, in which.

Figure 1:
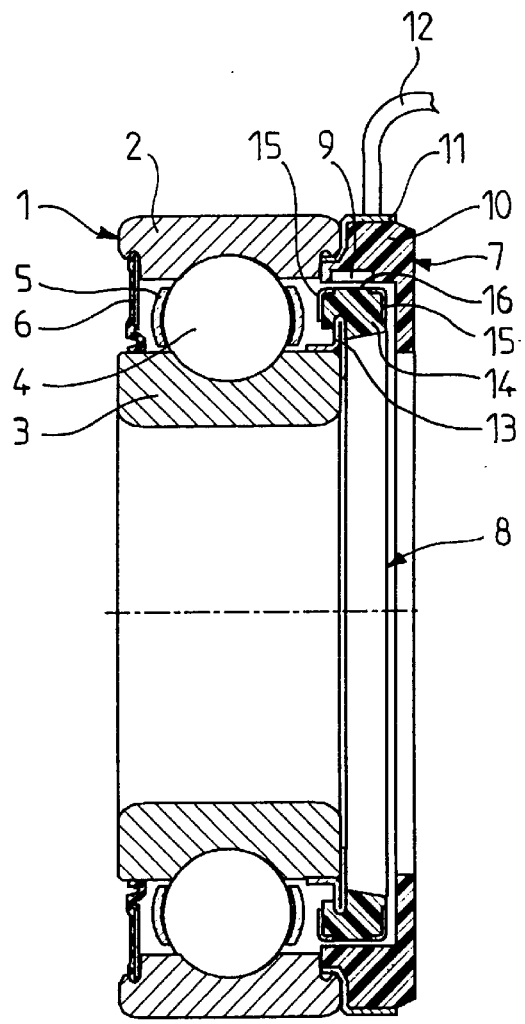
FIG. 1 is a view in axial section of a rolling-contact bearing equipped with an encoder according to a first embodiment of the invention.

As illustrated in FIG. 1, the rolling-contact bearing 1 comprises an outer race 2, an inner race 3, a row of balls 4 arranged between the outer race 2 and the inner race 3 and held by a cage 5, a seal 6 on one of its sides, and on the opposite side, a speed sensor 7 secured to the outer race 2 and an encoder 8 secured to the inner race 3.

The sensor 7 comprises a detection part 9 which is sensitive to variations in the magnetic field, for example a Hall-effect probe, a support unit 10 made of a synthetic material, and a metal element 11 push-fitted onto a bearing surface of the outer race 2. A cable 12 connected to the detection part 9 allows speed information to be transmitted to computation means, not depicted.

The encoder 8 (FIGS. 1 and 2) comprises a metal support 13, an active part 14 made using a plasto-magnet, and two annular reinforcing elements 15. The support 13 comprises a tubular part 13a push-fitted onto a bearing surface of the outer race 3. A first radial part 13b extending from one end of the tubular portion 13a outwards and a second radial portion 13c extending from the first radial portion 13b inwards. The radial portions 13b and 13c are in contact with each other. The support 13 may be formed by cutting and pressing a sheet metal blank. The small-diameter end of the second radial portion 13c butts against the edge of the inner race 3 in order to position the encoder 8 precisely with respect to the inner race 3 during push-fitting.

The annular active part 14 is overmoulded onto the support 13 and is in contact with the large-diameter ends of the radial portions 13b and 13c. The outer cylindrical surface of the active part 14 forms the active region 16 which faces the sensor 7, being separated therefrom by a small air gap.

The annular elements 15 are identical and mounted symmetrically one on each side of the active part 14. Each annular element 15 is in the form of a dish with a L-shaped cross section and comprises a radial portion 15a in contact with the edges 14a, 14b of the active part 14, and a cylindrical part 15b in contact with the active part 14 and lying flush with the active region 16. In order not to disturb the magnetic field created by the active part 14, the two annular elements 15 are made of a non-magnetic metal.

In operation, the fact that the active region 16 of the active part 14 which forms a multipole ring travels past the sensor 7, allows the latter to detect a variation in the magnetic field, which variation it can convert into an electrical signal proportional to the rotational speed of the rotating inner race 3 of the bearing 1. When high speeds are reached, the active part 14 experiences an outward radial acceleration, due to centrifugal force, especially at the magnetic particles which are more dense than the binder. The annular elements 15, thanks to their cylindrical part 15b, can take up the internal radial loadings generated in the active part 14 and avoid the formation of excessive tensile stresses which could cause the plasto-magnet to crack and shatter.

Any risk of the active part 14 becoming detached from its support 13 can also be avoided.

Under the action of heat, the annular elements 15 deform less than the active part 14 because of their low coefficient of expansion which, here too, allows them to avoid excessive deformation of the said active part 14 and to take up the internal radial loadings as before. In addition, the risks that might be encountered under the effect of a rise in temperature, of the active part 14 becoming detached from its support 13 if there were excessive differential expansion are avoided in this way. Should the inner race 3 expand, the tubular part 13a of the support 13 will be able to deform, but this deformation will not be passed on very much to the active part 14 on account of the radial rigidity afforded by the two radial parts 13b and 13c. The same applies when the tubular part 13a is being push-fitted onto the inner race 3.

Figures 2, 3, 4:
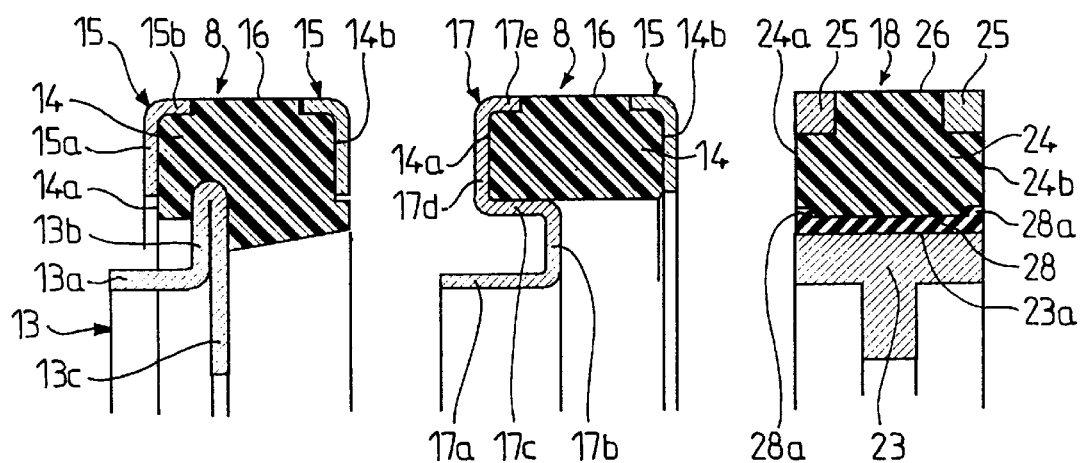
FIG. 2 is a part view of the encoder of FIG. 1.
FIG. 3 is a part view in axial section of an encoder according to a second embodiment of the invention.
FIG. 4 is a part view in axial section of an encoder according to a third embodiment of the invention.

The encoder 8 illustrated in FIG. 3 is fairly similar to the one in FIG. 2, except that it has just one annular element 15 on one side, and on the other side has a reinforcing and support element 17 which fulfils the functions of the support and of one of the annular elements of the previous embodiment. The element 17 comprises a first tubular portion 17a intended to be push-fitted onto the inner race of a bearing, a first radial portion 17b which makes it possible to prevent the deformation of the first tubular part 17a from being transmitted to the active part 14, a second tubular portion 17c which extends from the first axial portion 17b towards the inside of the bearing and is in contact with the bore of the active part 14, a second radial portion 17d equivalent to the radial portion 15a of the previous embodiment, and a third tubular portion 17e equivalent to the cylindrical portion 15b of the previous embodiment. This type of encoder is even more simple to manufacture, especially by overmoulding, in that the encoder has just two metal parts which need, of course, to be made of non-magnetic material.

In FIG. 4, references for elements which are similar to those of the preceding figures have been increased by the number 10. The encoder 18 comprises a relatively thick support 23 with a T-shaped cross section. The support 23 is designed to be push-fitted over a bearing surface of a bearing inner race. On the cylindrical outer surface 23a of the support 23 there is a layer 28 made of an elastomeric material with high elasticity and provided with two ribs 28a extending radially outwards at its axial ends. The active part 24 of the encoder 18 is fitted around the layer 28 and retained axially with respect to this layer by the ribs 28a. The encoder 18 also has two annular elements 25 with a more or less rectangular cross section, one mounted on each side of the active region 26 and lying flush with it. The annular elements 25 also lie flush with the lateral radial surfaces 24a and 24b of the active part 24.

This embodiment makes it possible to obtain a particularly compact encoder 18 provided with very simple annular elements 25 but which retains the same qualities of mechanical and temperature-related robustness as the previous embodiments, thanks to the elastic layer 28 which, if the support 23 deforms, prevents this deformation from being transmitted to the active part 24 by generating tensile stresses in the latter.

Thanks to the invention, an encoder which is particularly reliable and always delivers a high-quality signal can be obtained.

The annular reinforcing elements allow the encoder to be push-fitted onto a rotating element and to operate at high speed by limiting the internal tensile stresses in the active part.

Even if the active part that forms the multipole ring accidentally becomes cracked, the annular reinforcing elements prevent the active part from shattering under the effect of centrifugal force, and the said active part continues to deliver its magnetic signal. As the annular reinforcing elements are made of a non-magnetic material and leave the active region of the encoder free, they do not disturb the signal. The encoder according to the invention furthermore gets around the problems of temperature, as the annular reinforcing elements make it possible to limit the deformations of the active part of the encoder at high temperatures and to reduce the harmful effects of differential expansion of the active part of the encoder and of its support.

We claim:

1. An encoder device for detecting the rotational speed of a rotating member, the encoder device comprising:

an annular active part formed from a plasto-magnet and provided with an active region, the active region being positioned at an outer face of the active part so as to travel past a sensor for detecting the active region, and two annular reinforcing elements arranged in contact with the active part, one annular reinforcing element being positioned on either side of the active region so as to leave a portion of the active region exposed to the sensor, and each annular reinforcing element having a cylindrical portion extending over a portion of the outer face of the annular active part so as to be capable of taking up internal radial loadings generated in the active part during rotation of the active part, wherein the annular reinforcing elements are made of non-magnetic material and have an elastic modulus which is high compared with an elastic modulus of the active part and a coefficient of expansion which is low compared with a coefficient of expansion of the active part.

2. Device according to claim 1, wherein at least one of the annular reinforcing elements extends between the active region and a radial face of the encoder, the active region being cylindrical.

3. Device according to claim 1, wherein the annular reinforcing elements lie flush with the active region.

4. Device according to claim 1, wherein each of the annular reinforcing elements includes a radial portion extending along a radial side of the active part.

5. Device according to claim 4, wherein the annular reinforcing elements are in the shape of a dish with a L-shaped cross section.

6. An encoder device for detecting the rotational speed of a rotating member, the encoder device comprising:

an annular active part formed from a plasto-magnet and provided with an active region, the active region being positioned at an outer face of the active part so as to travel past a sensor for detecting the active region, and two annular reinforcing elements arranged in contact with the active part, one annular reinforcing element being positioned on either side of the active region so as to leave a portion of the active region exposed to the sensor, and each annular reinforcing element having a cylindrical portion extending over a portion of the outer face of the annular active part so as to be capable of taking up internal radial loadings generated in the active part during rotation of the active part, and wherein the annular reinforcing elements have a substantially rectangular cross section.

7. An encoder device for detecting the rotational speed of a rotating member, the encoder device comprising:

an annular active part formed from a plasto-magnet and provided with an active region, the active region being positioned at an outer face of the active part so as to travel past a sensor for detecting the active region, and two annular reinforcing elements arranged in contact with the active part, one annular reinforcing element being positioned on either side of the active region so as to leave a portion of the active region exposed to the sensor, and each annular reinforcing element having a cylindrical portion extending over a portion of the outer face of the annular active part so as to be capable of taking up internal radial loadings generated in the active part during rotation of the active part, wherein each of the annular reinforcing elements includes a radial portion extending along a radial side of the active part, and wherein one of the annular reinforcing elements includes a support arranged to be push-fitted onto the rotating member.

8. Device according to claim 1, wherein the active part of the encoder is overmoulded onto the annular reinforcing elements.

9. Device according to claim 1, wherein the annular reinforcing elements are bonded to the active part of the encoder.

10. Device according to claim 1, wherein the annular reinforcing elements are push-fitted onto the active part of the encoder.

11. A rolling-contact bearing, comprising:

a rotating race;

a non-rotating race;

an encoder device as recited in claim 1 mounted on the rotating race; and a sensor mounted on the non-rotating race for detecting rotation of the encoder device to determine a rotational speed of the rotating race with respect to the non-rotating race.

12. Device according to claim 1, further including a support for supporting the device on the rotating member, the support being arranged to be push-fitted onto the rotating member.

13. Device according to claim 12, wherein the active part of the encoder is overmoulded onto the support.

14. A rolling-contact bearing, comprising:

a rotating race;

a non-rotating race;

an encoder device mounted on the rotating race for detecting the rotational speed of a rotating member, the encoder device including:

an annular active part formed from a plasto-magnet and provided with an active region, the active region being positioned at an outer face of the active part so as to travel past a sensor for detecting the active region, and two annular reinforcing elements arranged in contact with the active part, one annular reinforcing element being positioned on either side of the active region so as to leave a portion of the active region exposed to the sensor, and each annular reinforcing element having a cylindrical portion extending over a portion of the outer face of the annular active part so as to be capable of taking up internal radial loadings generated in the active part during rotation of the active part;

a support for supporting the device on the rotating member, the support being arranged to be push-fitted onto the rotating member;

a sensor mounted on the non-rotating race for detecting rotation of the encoder device to determine a rotational speed of the rotating race with respect to the non-rotating race; and a layer of elastomeric material positioned between the support and the active part.

15. Device according to claim 14, wherein the layer of elastomeric material includes radially extending ribs at axial ends thereof, for axially retaining the active part.

16. A rolling-contact bearing, comprising:

a rotating race;

a non-rotating race;

an encoder device mounted on the rotating race for detecting the rotational speed of a rotating member, the encoder device including:

an annular active part formed from a plasto-magnet and provided with an active region, the active region being positioned at an outer face of the active part so as to travel past a sensor for detecting the active region, and two annular reinforcing elements arranged in contact with the active part, one annular reinforcing element being positioned on either side of the active region so as to leave a portion of the active region exposed to the sensor, and each annular reinforcing element having a cylindrical portion extending over a portion of the outer face of the annular active part so as to be capable of taking up internal radial loadings generated in the active part during rotation of the active part, wherein the annular reinforcing elements have a substantially rectangular cross section; and a sensor mounted on the non-rotating race for detecting rotation of the encoder device to determine a rotational speed of the rotating race with respect to the non-rotating race.

17. A rolling-contact bearing, comprising:

a rotating race;

a non-rotating race;

an encoder device mounted on the rotating race for detecting the rotational speed of a rotating member, the encoder device including:

an annular active part formed from a plasto-magnet and provided with an active region, the active region being positioned at an outer face of the active part so as to travel past a sensor for detecting the active region, and two annular reinforcing elements arranged in contact with the active part, one annular reinforcing element being positioned on either side of the active region so as to leave a portion of the active region exposed to the sensor, and each annular reinforcing element having a cylindrical portion extending over a portion of the outer face of the annular active part so as to be capable of taking up internal radial loadings generated in the active part during rotation of the active part, wherein each of the annular reinforcing elements includes a radial portion extending along a radial side of the active part; and a sensor mounted on the non-rotating race for detecting rotation of the encoder device to determine a rotational speed of the rotating race with respect to the non-rotating race.

18. Device according to claim 17 wherein the annular reinforcing elements are in the shape of a dish with a L-shaped cross section.

19. Device according to claim 11, wherein the annular reinforcing elements lie flush with the active region.

* * * * *